United States Patent Office 3,030,374
Patented Apr. 17, 1962

3,030,374
ACID-TREATED BORATED OXAZOLINES
Sarah H. Belden, Cleveland, Ohio, assignor to The Standard Oil Company, Cleveland, Ohio, a corporation of Ohio
No Drawing. Original application Feb. 25, 1959, Ser. No. 795,348, now Patent No. 2,993,765, dated July 25, 1961. Divided and this application Dec. 30, 1959, Ser. No. 3,224
2 Claims. (Cl. 260—307)

This invention relates to novel boron compounds.

This application is a division of my application Serial No. 795,348, filed February 25, 1959, now Patent No. 2,993,765 granted June 25, 1961.

Co-pending application Serial No. 795,349, filed February 25, 1959, now Patent No. 2,965,459, which is assigned to my assignee and of which I am a co-inventor, discloses a class of novel borated oxazoline compounds for use in gasoline which are selected from the group consisting of (1)

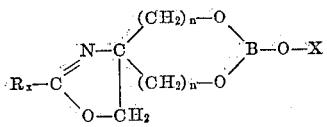

where X is selected from the group consisting of hydrogen and

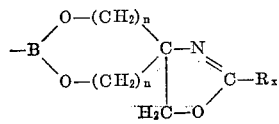

and (2)

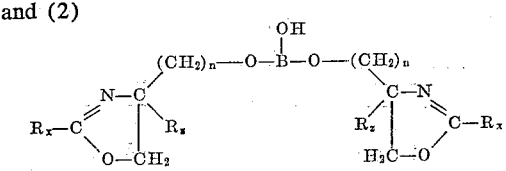

wherein $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms.

A gasoline containing small amounts of a boron compound selected from this group of compounds is disclosed as offering improved engine operation, being particularly effective in suppressing surface ignition and in alleviating carburetor deposits and carburetor icing. These boron compounds are particularly desirable for use as additives for gasoline because, in contradistinction to many other organo boron compounds, they exhibit excellent stability toward hydrolysis in pure form and when dissolved in gasoline.

Any of the compounds having the general formula offered above are suitable for the present invention. The preferred compounds, however, are those in which $R_x$ as defined heretofore contains 11 to 17 carbon atoms for maximum solubility in hydrocarbon fuel and where $R_z$ is the equivalent of $R_y$. Mixtures of compounds may be used as $R_x$, and this frequently will be the case since the $R_x$ radical is derived from naturally occurring fats and oils, and hence $R_x$ will correspond to the fatty acid radicals in such fats and oils, such as tallow, cottonseed oil, soybean oil, etc. The nature of $R_x$ does not affect the results appreciably, it has been found, and therefore its selection will be dictated largely by economics. The commercial grade of the compounds, including small amounts of impurities or by-products, are suitable.

Further information as to the nature of these compounds, the manner in which they may be prepared, and the benefits which may be derived from the gasoline in which they are incorporated may be gained from said application Serial No. 795,349, and the description of said application Serial No. 795,349 is incorporated herein by reference to such an extent as is required for a complete understanding of these compounds.

It has now been found that such borated oxazoline compounds may be further improved for use as a gasoline additive by further reaction with an acid. The present invention is not to be limited to any particular theory with respect to the manner in which the acid adds to the borated ozazoline compounds, but it is believed that the acid coordinates with the nitrogen atom present in the ozazoline ring resulting in the formation of a salt.

The pH of the borated oxazoline compound is lowered almost immediately upon mixing at ambient temperature with the desired amount of acid. Water of reaction may be formed in the reaction, depending upon the acid used and its form. In some instances it will be desired to remove this water before incorporating the additive into gasoline. Where it is desired to remove the water of reaction in the preparation, the borated oxazoline may be reacted with the acid in the presence of a solvent which azeotropes with water, such as benzene. The reaction mixture is then refluxed at the azeotropic distillation temperature for a time to effect the removal of the water with the solvent.

The above acid-treated boron compounds of this invention may be incorporated in gasoline in amounts between 0.0025 to 0.05% by weight, with amounts from 0.02 to 0.05% by weight being preferred.

The acid that is used to treat the borated oxazoline should be a non-oxidizing acid, and boric, phosphoric, hydrochloric, acetic, and oxalic, or mixtures thereof, or anhydrides thereof, are illustrative. The oxidizing acids such as nitric, sulfuric, perchloric, peracetic, etc. are not preferred. The amount of the acid should be such as to lower the pH value of the resulting product, as determined at 25% of the final product in benzene in accordance with techniques described in ASTM–D664–54 from about 6.7 to a range of from 3.0 to 6.0, and preferably 3.3 to 5.7. The choice of the acid or acids to be used will, of course, be determined by economics, pH considerations, and by the performance benefits which are desired.

The following examples are in no way intended to limit the invention but are presented to typify the process of this acid addition to borated oxazoline compounds of which Example A below is exemplary, and to illustrate the reaction products that are obtained thereby.

EXAMPLE A 100 parts of 2-heptadecenyl 4,4-bis-(hydroxy methyl) oxazoline was dissolved in 200 parts of benzene. 16.8 parts of boric acid was then added (a 1:1 molar ratio) and the mixture refluxed at the azeotropic distillation temperature for the removal of water with the benzene overhead from the reaction mixture. The remainder of the benzene was distilled off. The reaction proceeds readily in accordance with the following equation:

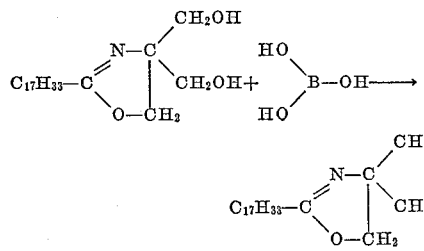

The reaction product was a clear liquid upon cooling and was soluble in gasoline. Its pH was 6.7.

EXAMPLE 1

100 parts of borated 2-heptadecenyl 4,4-bis-(hydroxy methyl) oxazoline having the formula $C_{22}H_{41}NBO_4$, as made in accordance with Example A, was reacted with 15.2 parts of acetic acid (a 1:1 molar ratio) in 200 parts of benzene and refluxed at the azeotropic distillation temperature for several hours for the removal of water with the benzene. Upon cooling, the reaction product was clear and readily soluble in gasoline. The pH of the reaction product was 5.7.

EXAMPLE 2

100 parts of borated 2-heptadecenyl 4,4-bis-(hydroxy methyl) oxazoline having the formula $C_{22}H_{41}NBO_4$ was reacted with 6.1 parts of $P_2O_5$ (a 1:0.17 molar ratio) and 5 parts water in 200 parts of benzene and refluxed at the azeotropic distillation temperature for two hours. The reaction product upon cooling was clear and readily soluble in gasoline. The pH of the product was 4.2.

EXAMPLE 3

100 parts of borated 2-heptadecenyl 4,4-bis-(hydroxy methyl) oxazoline having the formula $C_{22}H_{41}NBO_4$ was reacted with 16.1 parts of oxalic acid dihydrate (a 1:0.5 molar ratio) in 200 parts of benzene and refluxed at the azeotropic distillation temperature for several hours for the removal of water with benzene. The reaction product upon cooling was clear and readily soluble in gasoline. The pH of the reaction product was 3.3.

The results in Table I below illustrate the improvement toward emulsification characteristics obtained with gasolines containing the acid-treated borated oxazoline compounds of this invention.

The results reported were obtained in accordance with aviation gasoline water tolerance test as set forth in ASTM–D1094–53. In this test, 20 ml. of water is shaken with 80 ml. of gasoline in a graduated cylinder for two minutes at ambient temperature. The change of hydrocarbon level is then observed. The lower the change of hydrocarbon volume, the less tendency the gasoline has to emulsify with the water. In addition, in the present test the cuff height, which normally appears as a distinct and cloudy layer between the hydrocarbon phase and the water phase, was also measured. The lower the cuff height, the less tendency the gasoline has to emulsify with water. In all runs the gasoline tested was the same except for the additive. The test was run on borated 2-heptadecenyl 4,4-bis-(hydroxy methyl) oxazoline (additive No. A, which is the product of Example A above) and acid-treated derivatives of the same (additive Nos. 1 to 5). Additives Nos. 1 to 5 were prepared by treating additive No. A with different acids in an amount sufficient to furnish one mole of hydrogen per mole of borated oxazoline, and additive Nos. 1 to 3 correspond to the products of Examples 1 to 3 above, respectively. The quantity of borated 2-heptadecenyl 4,4-bis-(hydroxy methyl) oxazoline in each gasoline was the same and was an amount to supply 0.001% by weight boron to the gasoline. The pH of each of the additives is given in Table I to indicate the relationship of the pH value of the additives to cuff height and change of hydrocarbon volume.

Table I

| No. | Additive | pH | Ml. of Hydrocarbon Change | Ml. of Cuff Height |
|---|---|---|---|---|
| A | Borated 2-heptadecenyl 4,4-bis-(hydroxy methyl) oxazoline. | 6.7 | −3 | 23 |
| 1 | Borated 2-heptadecenyl 4,4-bis-(hydroxy methyl) oxazoline+Acetic Acid. | 5.7 | −3 | 8 |
| 2 | Borated 2-heptadecenyl 4,4,-bis-(hydroxy methyl) oxazoline+Phosphoric Acid. | 4.2 | 0 | 5 |
| 3 | Borated 2-heptadecenyl 4,4-bis-(hydroxy methyl) oxazoline+Oxalic Acid. | 3.3 | −2 | 12 |
| 4 | Borated 2-heptadecenyl 4,4-bis-(hydroxy methyl) oxazoline+Boric Acid. | 6.6 | −2 | 22 |
| 5 | Borated 2-heptadecenyl 4,4,-bis-(hydroxy methyl) oxazoline+Hydrochloric Acid. | 2.9 | −1 | 21 |

As may be seen from Table I, a smaller cuff height is noted between a pH range of from 5.7 to 3.3. Furthermore, in Table I the hydrocarbon volume change is indicated to be at an optimum at a pH of 4.2.

The same test was run on a series of gasoline compositions incorporating additives covering the same pH range provided in Table I, said additives being prepared by treating borated 2-heptadecenyl 4,4-bis-(hydroxy methyl) oxazoline with varying amounts of hydrochloric acid. These results are recorded in Table II below. The base gasoline was the same for all tests and the amount of additive added to the fuel was sufficient to supply 0.001% by weight boron to the gasoline in each instance.

Table II

| Additive | pH | Ml. of Cuff Height |
|---|---|---|
| Borated 2-heptadecenyl 4,4,-bis-(hydroxy methyl) oxazoline | 6.7 | 23 |
| Borated 2-heptadecenyl 4,4-bis-(hydroxy methyl) oxazoline+Hydrochloric Acid | 4.4 | 23 |
| Do | 4.0 | 5 |
| Do | 2.9 | 21 |

It will be observed that the lowest cuff height is observed when the pH value of the additive is 4.0, which corresponds to the most favorable pH value for the additives shown in Table I above.

I claim:

1. A member selected from the group consisting of boron compounds and mixtures of said compounds, said boron compounds being prepared by reacting a borated oxazoline compound selected from the group consisting of (1)

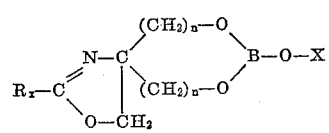

where X is selected from the group consisting of hydrogen and

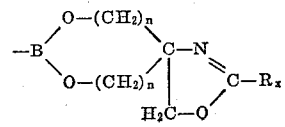

and (2)

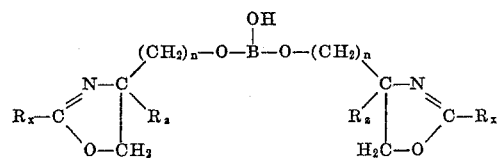

where $R_x$ is a member selected from the group consisting of alkyl and alkenyl both of 7–19 carbon atoms and mixtures of these as derived from naturally occurring fats and oils, where $n$ is a small whole number from 1 to 3, and where $R_z$ is selected from the group consisting of hydrogen and lower alkyl of 1 to 3 carbon atoms; with an acid selected from the group consisting of phosphoric, hydrochloric, acetic, and oxalic, in an amount so that the resulting product with phosphoric acid has a pH value of substantially 4.2, with hydrochloric acid has a pH value of substantially 4.0, with acetic acid has a pH value of substantially 5.7, and with oxalic acid has a pH value of substantially 3.3.

2. A method of preparing a member selected from the group consisting of boron compounds and mixtures of said compounds for use in gasoline which comprises reacting a borated oxazoline compound selected from the group consisting of (1)

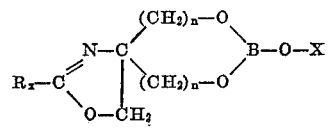

where X is selected from the group consisting of hydrogen and

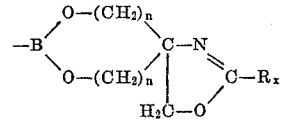

and (2)

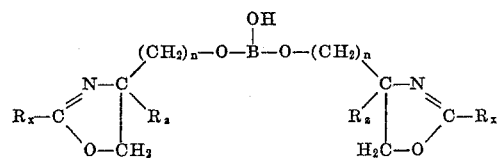

where $R_x$ is a member selected from the group consisting of alkyl and alkenyl both of 7–19 carbon atoms and mixtures of these as derived from naturally occurring fats and oils, where $n$ is a small whole number from 1 to 3, and where $R_z$ is selected from the group consisting of hydrogen and lower alkyl of 1 to 3 carbon atoms; with an acid selected from the group consisting of phosphoric, hydrochloric, acetic, and oxalic, in an amount so that the resulting product with phosphoric acid has a pH value of substantially 4.2, with hydrochloric acid has a pH value of substantially 4.0, with acetic acid has a pH value of substantially 5.7, and with oxalic acid has a pH value of substantially 3.3.

No references cited